US009037805B2

(12) United States Patent
Jea et al.

(10) Patent No.: US 9,037,805 B2
(45) Date of Patent: *May 19, 2015

(54) MANAGING A REGION CACHE (71) Applicant: INTERNATIONAL BUSINESS MACHINES CORPORATION, Armonk, NY (US)

(72) Inventors: Tsai-Yang Jea, Poughkeepsie, NY (US); Zhi Zhang, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/093,036

(22) Filed: Nov. 28, 2013

(65) Prior Publication Data
US 2014/0089601 A1    Mar. 27, 2014

Related U.S. Application Data (63) Continuation of application No. 13/323,938, filed on Dec. 13, 2011.

(51) Int. Cl.
G06F 13/00    (2006.01)
G06F 13/28    (2006.01)
G06F 12/08    (2006.01)
G06F 17/30    (2006.01)

(52) U.S. Cl.
CPC ........ *G06F 12/0815* (2013.01); *G06F 12/0895* (2013.01); *G06F 17/30132* (2013.01)

(58) Field of Classification Search
USPC .......................................... 711/133, E12.041
See application file for complete search history.

(56) References Cited

U.S. PATENT DOCUMENTS

7,683,940 B2    3/2010    Fleming
7,970,997 B2    6/2011    Watanabe
2010/0100674 A1    4/2010    Chan et al.

*Primary Examiner* — Edward Dudek, Jr.
(74) *Attorney, Agent, or Firm* — Paul S. Drake (57) ABSTRACT A method for managing a cache region including receiving a new region to be stored within the cache, the cache including multiple regions defined by one or more ranges having a starting index and an ending index, and storing the new region in the cache in accordance with a cache invariant, the cache invariant ensuring that regions in the cache are not overlapping and that the regions are stored in a specified order.

9 Claims, 7 Drawing Sheets

MANAGING A REGION CACHE

This application is a continuation of application Ser. No. 13/323,938 filed Dec. 13, 2011 entitled "MANAGING A REGION CACHE", the disclosure of which is incorporated in its entirety herein by reference.

This invention was made with United States Government support under Agreement No. HR0011-07-9-0002 awarded by DARPA. The Government has certain rights in the invention.

BACKGROUND

1. Technical Field

The present invention relates generally to managing computer data, and in particular, to a computer implemented method and system for efficiently managing a region cache.

2. Description of Related Art

Many computing environments utilize a variety of techniques for managing the storage and distribution of data. Often this data may be transparently stored in a portion of memory referred to as a cache for future high speed access. There are many kinds of caches that are useful in a variety of situations.

One type of cache is a region cache. A region cache is a software structure that resides in memory and includes one or more regions of data, each region having a starting index and an ending index. A region cache may be stored anywhere in memory accessible by the software that manages or uses the region cache. A region cache may be implemented, managed or used by an operating system, a web browser, an application, or any other type of software.

SUMMARY

The illustrative embodiments provide a method for managing a cache region including receiving a new region to be stored within the cache, the cache including multiple regions defined by one or more ranges having a starting index and an ending index, and storing the new region in the cache in accordance with a cache invariant, the cache invariant ensuring that regions in the cache are not overlapping and that the regions are stored in a specified order.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Steps may be taken to efficiently manage a region cache. These steps may be taken as will be explained with reference to the various embodiments below.

Figure 1:
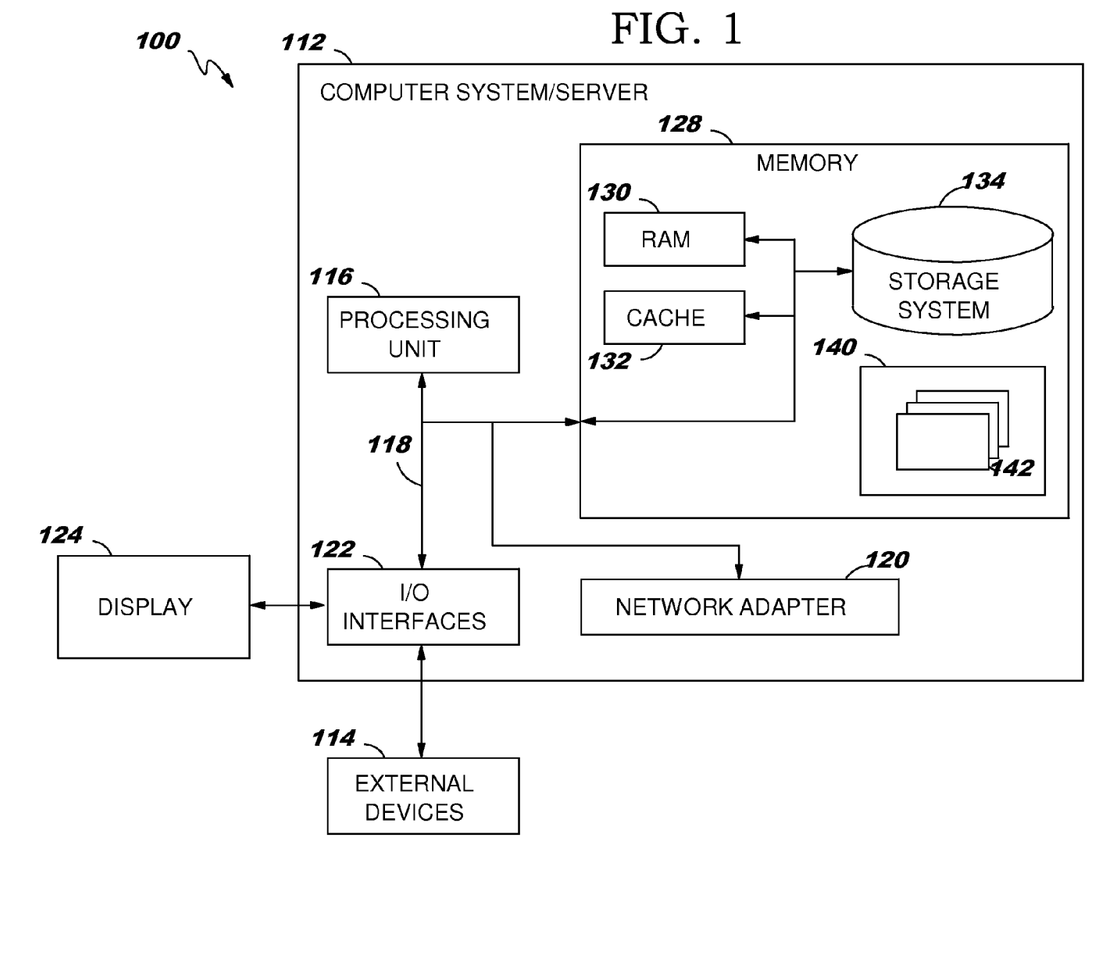
FIG. 1 is a block diagram of a data processing system in which various embodiments may be implemented.

FIG. 1 is a block diagram of a data processing system in which various embodiments may be implemented. Data processing system 100 is only one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/ non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces.

Memory 128 may include at least one program product having a set (e.g., at least one) of program modules that are configured to carry out the functions of embodiments of the invention. Memory 128 may also include data that will be processed by a program product. This data may be organized in a variety of ways to allow efficient storage, management and retrieval of that data by one or more software applications, whether local or remote to the data processing system. One example would be a software cache such as a region cache to provide efficient access to data to multiple software applications. Such a region cache may be managed by an application also stored in memory referred to herein as a region cache manager.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
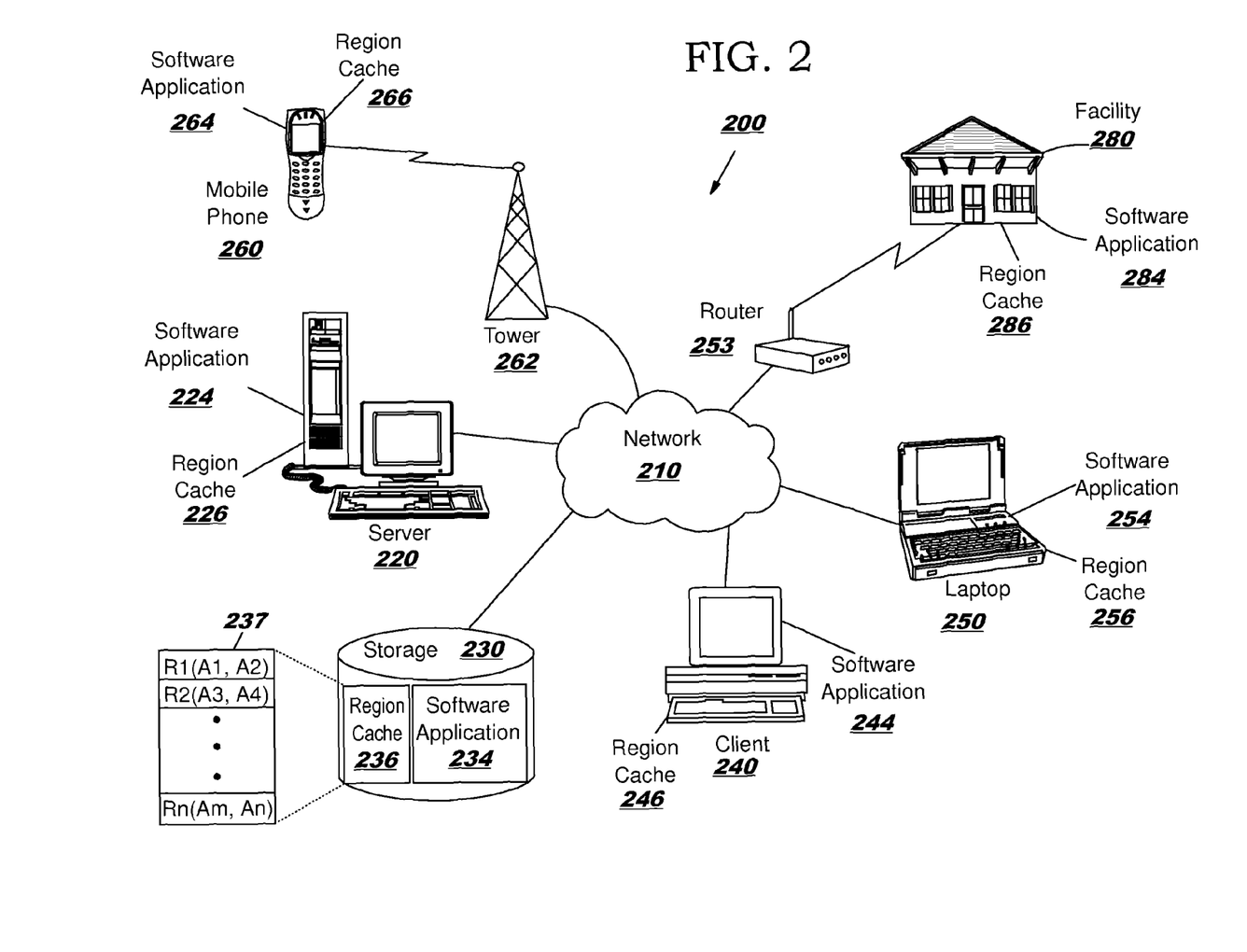
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 120, client 140, laptop 150, mobile phone 160 and facility 180 contain data and have software applications including software tools executing thereon. Other types of data processing systems such as personal digital assistants (PDAs), smartphones, tablets and netbooks may be coupled to network 210.

Server 220 may include software application 224 such as for storing, managing or accessing data such as in a region cache. Storage 230 may contain software application 234 and a content source such as a region cache 236 for storing data accessible by a variety of applications across processing environment 200. Application 224 may serve as the region cache manager for region cache 236. Region cache 236 is shown in an enlarged view 237. The region cache includes multiple regions, each region including a starting index and an ending index. These indexes may represent memory addresses or other types of data depending on the use of the region cache. Additional information may also be stored in the region cache including additional information about each region.

Other software and content may be stored on storage 230 for sharing among various computer or other data processing devices. Client 240 may include software application 244 and region cache 246. Laptop 250 and mobile phone 260 may also include software applications 254 and 264 and region caches 256 and 266. Facility 280 may include software application 284 and region cache 286. Other types of data processing systems coupled to network 210 may also include software applications and region caches. Any of these software applications may serve as a region cache manager for any other region cache depending on security and access requirements. In addition, any of these software applications may access any other region cache depending on security and access requirements. Software applications could include a web browser, email, or other software application that can process sensor and maintenance information of an environmental control unit or other type of information to be processed. Region caches could be in any location in memory or distributed across multiple locations within data processing environment 200. Depending on security requirements and interfacing capabilities, region caches may also be accessible by software applications across data processing environment 200.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Figure 3A:
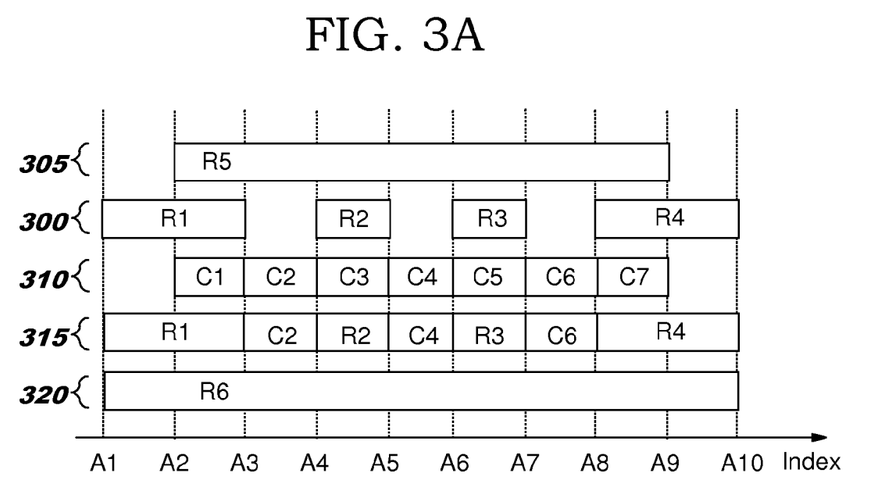
FIGS. 3A and 3B illustrate inserting a region into a region cache in which various embodiments may be implemented.
Figure 3B:
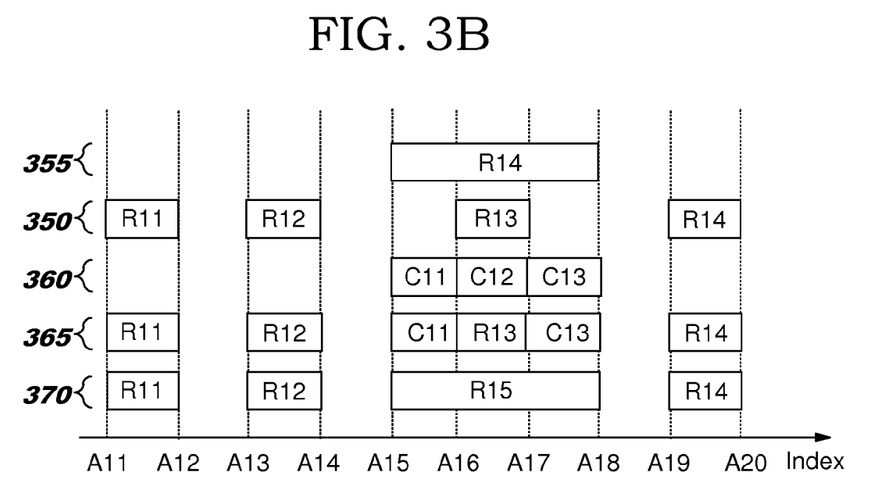

FIGS. 3A and 3B illustrate inserting a region into a region cache in which various embodiments may be implemented. This region caching model can be used in any dimensional space. For the sake of simplicity, the following description relates to a one dimensional space. However, this is only an example and the present invention is not so limited.

A region cache is utilized for memory registration. It is not used as a form of memory allocation in the embodiments described herein, although it could be used to implement a form of memory allocation. That is, it is a bookkeeping of the registration state of the memory regions, whether previously registered or not. Inserting a new region onto existing regions will not cause a memory violation. For example, remote direct memory access (RDMA) can be directly performed on user buffers without intervention of the operating system. RDMA requires pinning and registration of user buffers to hardware prior to a data transfer to prevent the physical memory from being swapped out. If any portion of the user buffer being accessed by RDMA has not been previously registered, then that portion of the user buffer needs to be registered by modifying the region entry into the region cache.

In these embodiments, a cache invariant is enforced where no region overlaps another region at any time. That is, no region has a starting index value less than the starting index of another region and an ending index greater than or equal to the starting index of the other region. In addition, the cache invariant is enforced where no region should be contiguous to another region. That is, no region should have a starting index that is only one address higher than the ending index of another region. In such a case, the contiguous regions should be coalesced into a single region. The cache invariant may also be enforced where all regions in the region cache are stored in a specified order. This may be by starting index of each region or by ending index of each region. This cache invariant provides for certain efficiencies when the indexes of a request region are checked against the indexes of the cache regions. An example of this usage would be memory registration on a host fabric interface (HFI) in anticipation of a remote direct memory access (RDMA).

FIG. 3A illustrates an existing set of regions 300 and a region to be inserted 305. The existing regions include R1 with starting index of A1 and an ending index of A3 (e.g. R1 (A1, A3)), region R2 (A4, A5), region R3 (A6, A7) and region R4 (A8 and A9). The region to be inserted includes region R5 (A2, A9). As described above, overlapping regions are not allowed in accordance with the cache invariant. First R5 is split into chunks 310 in two categories. The first set of chunks includes those that overlap existing regions (C1, C3, C5 and C7). As these chunks are already in existing regions, they do not have to be processed as they have already been registered. The second set of chunks includes those that do not overlap existing regions (C2, C4 and C6), referred to herein as gaps. As those are not in existing regions, they will need to be processed. The result of that processing would pre-coalesced regions R1, C2, R2, C4, R3, C6 and R4. Once processed, then all contiguous regions would need to be coalesced, resulting in region 315 shown as R6.

FIG. 3B illustrates an existing set of regions 350 and a region to be inserted 355. The existing regions include R11 (A11, A12), R12 (A13, A14), R13 (A16, A17) and R14 (A19, A20). The region to be inserted includes R14 (A15, A18). These regions could be in the same region cache shown in FIG. 3A. First R14 is split into chunks 360 in two categories. The first set of chunks includes those that overlap existing regions (C12). As these chunks are already in existing regions, they do not have to be processed. The second set of chunks includes those that do not overlap existing regions (C11 and C13) referred to herein as gaps. As this chunk is not in an existing region, it will need to be processed. The result of that processing would pre-coalesced regions R11, R12, C11, R13, C13 and R14. Once processed, then all contiguous regions would need to be coalesced, resulting in regions 370 shown as R11, R12, R15 and R14.

If the cache invariant was not enforced in the above two examples, then then there may be more regions than shown. For example, if the regions were allowed to overlap or adjoin each other, then R2 of FIG. 3A may be composed of multiple overlapping regions. As a result, inserting R5 may involve comparing the range of that region against more preexisting regions than currently shown in FIG. 3A, thereby requiring more processing time.

Figure 4:
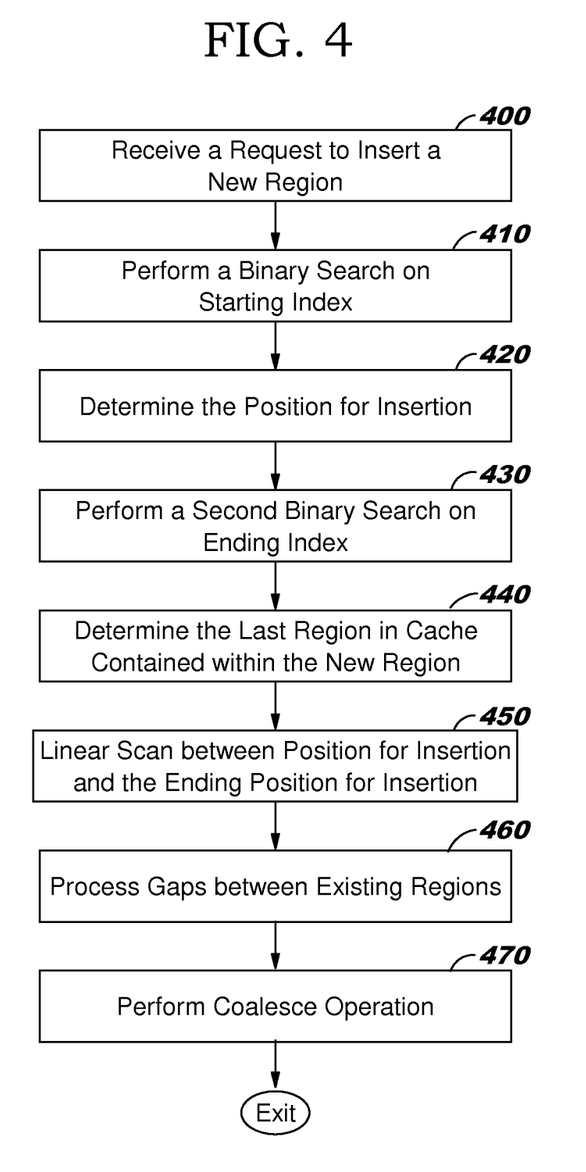
FIG. 4 is a flowchart of inserting a new region into a region cache in accordance with a first embodiment.

FIG. 4 is a flowchart of inserting a new region into a region cache in accordance with a first embodiment. In a first step 400 the region cache manager receives a request to insert a new region into the region cache. This request may be received from a software application that is local or across a network. The request should include a starting index and an ending index of the requested region to be inserted. In step 410, the region cache manager performs a binary search on the current region cache to find the position of insertion. In this embodiment, the current regions are sorted by starting index, so the binary search is performed using that starting index. Alternative embodiments may use alternative types of searches or the regions may be sorted by ending index. If sorted by ending index, then steps 410 and 430 may be reversed so that the ending index of the current region cache is searched first.

The binary search does not search for an exact match, but returns results based on criteria and assumptions that are guaranteed by the cache invariant. The binary search takes the starting index of the region to be inserted as input, and returns a position. More specifically, in this one dimensional case, the regions are sorted by the starting index in increasing order in the cache, and the binary search returns the position of the region whose starting index is greatest but smaller than the starting index of the region to be inserted. In an embodiment where the binary search is on the ending index of the region to be inserted, the binary search returns the region whose index is smallest but greater than the ending index of the region to be inserted. Because the region cache manager ensures that the cache invariant holds true, the cache is guaranteed to be free of regions that are entirely contained within another region.

Therefore, the simple binary search criteria always return positive results, even though an exact match is not always returned.

Based on the binary search results, the position of insertion is determined in step 420. However, if the starting index of the region being inserted is less than the starting index of the identified current region (i.e. there is no current region with a lower starting index), then the starting index of the region being inserted is used as the starting insertion index. This starting position for insertion is referred to herein as the first marked position. In the above described examples, the result of this initial search would be A1 of region R1 in the example of FIG. 3A and A13 of region R12 in the example of FIG. 3B.

The region cache manager then performs a second binary search on the ending index of the new region in step 430. In step 440, the region cache manager determines the last region in the cache that is at least partially contained within the region to be inserted. In this example, the search returns the ending index of a current region in the cache with the greatest starting index that is smaller than the ending index of the new region requested to be inserted. However, if the ending index of the region being inserted is greater than the ending index of the identified current region, then the ending index of the region being inserted is used as the ending insertion index. This ending index for insertion is referred to herein as the second marked position. In the above described examples, the result of this second search would be A10 of region R4 in the example of FIG. 3A and A17 of region R12 in the example of FIG. 3B.

In step 450, the area between the first marking position and the second marking position is scanned linearly to identify gaps within that are not currently occupied by existing regions. In the above described examples, the result of this identification would be C2, C4 and C5 in the example of FIG. 3A and C11 and C12 in the example of FIG. 3B. These gaps are processed in step 460 to register those gaps. The type of processing or registration would depend on the use of the region cache. For example, if the region cache is used for RDMA data transfers, the registration would be for pinning memory to prevent the physical memory from being swapped out. Areas already occupied by existing regions do not need to be processed because those areas are already registered. This processing of gaps results in the new region being inserted into the region cache, albeit piecemeal.

Finally, in step 470, a coalescing operation is performed as shown in either FIG. 5A or 5B. This removes all continuous regions and reduces the number of regions to be searched in additional region insertion operations or future cache lookup operations.

Figure 5:
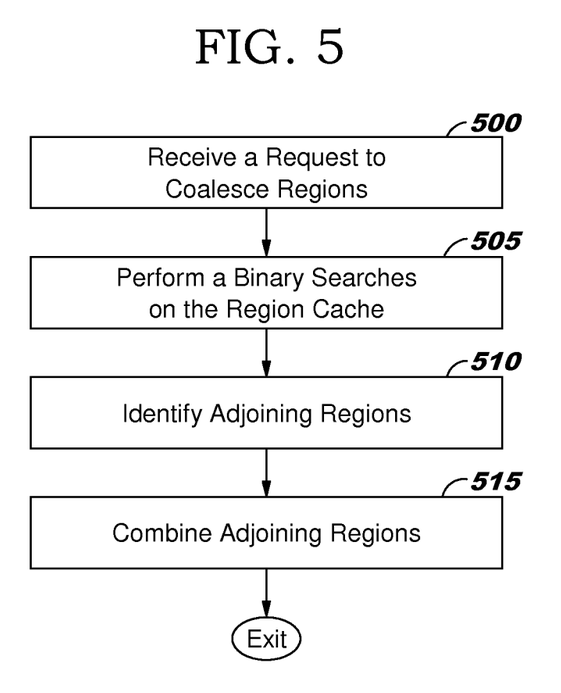
FIG. 5 is a flowchart of coalescing regions that do not meet the cache invariant into a single region in which various embodiments may be implemented.

FIG. 5 is a flowchart of coalescing regions that do not meet the cache invariant into a single region in which various embodiments may be implemented. This reduces the number of regions in the region cache and reduces the amount of searching needed to look up or insert a region. In a first step 500 the region cache manager receives a request for coalescing regions in the cache. This request may be an internal call from the region cache manager such as at the end of an insertion process. The request may include a range to search including the starting index and the ending index as described above with reference to FIG. 4. In this example, the regions in the cache are sorted by the starting index of each region, as shown in the examples of FIGS. 3A and 3B above.

The region cache manager then performs binary searches in step 505 using the starting index and the ending index to identify the starting of the first potential region to be combined and the ending index of the last potential region to be combined. In the above described examples, the result of this identification would be R1 and R4 in the example of FIG. 3A and R12 and C13 in the example of FIG. 3B. The region cache manager then identifies the adjoin regions to be combined in step 510. In the above described examples, the result of this identification would be R1, C2, R2, C4, R3, C6 and R4 in the example of FIG. 3A and C11, R13 and C13 in the example of FIG. 3B. The region cache manager then combines these adjoining regions in step 515. Alternative methods of coalescing regions may be used including a full linear scan of the region cache for adjoining regions.

Figure 6:
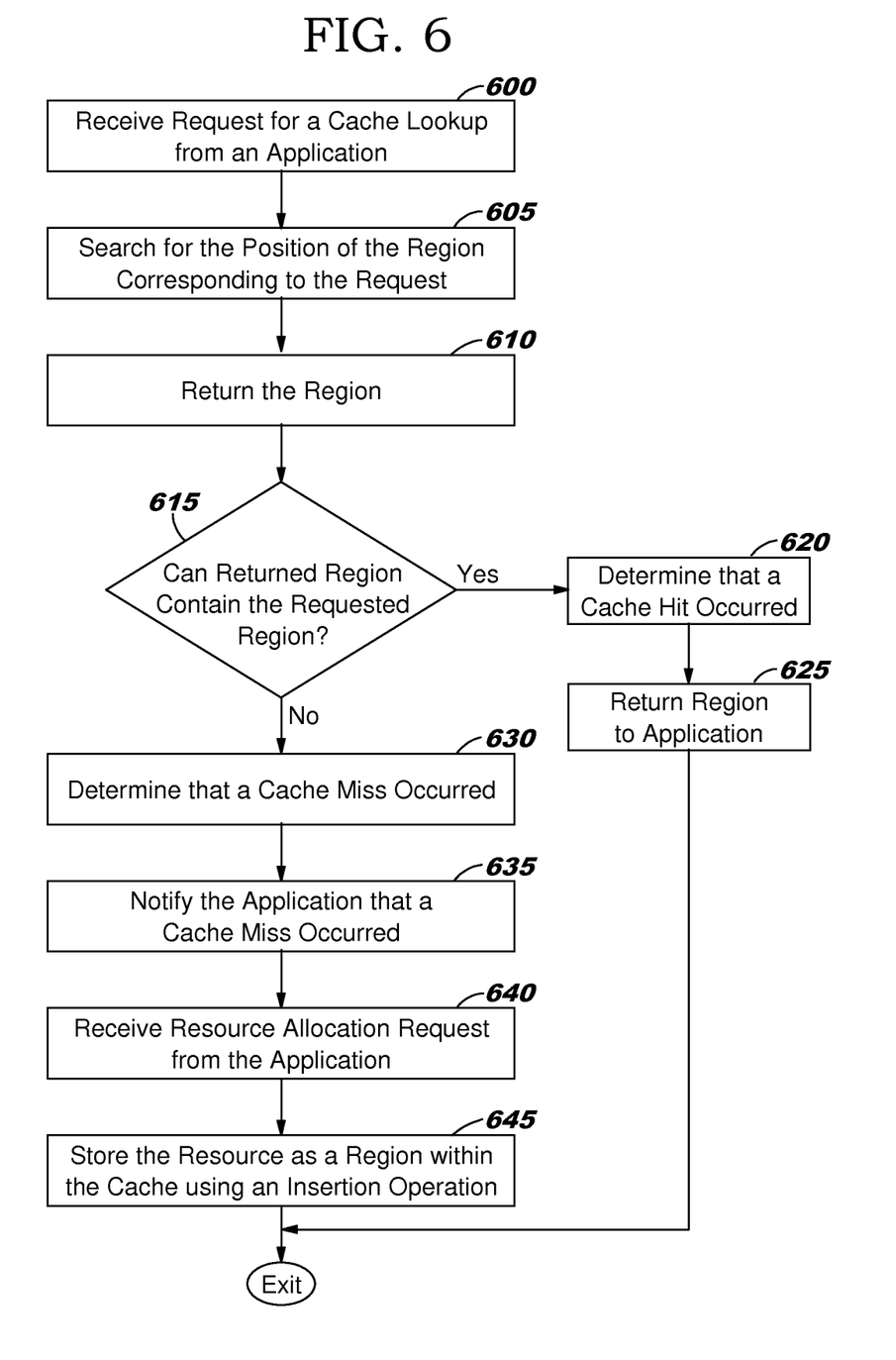
FIG. 6 is a flowchart of performing a lookup operation in which various embodiments may be implemented.

FIG. 6 is a flowchart of performing a lookup operation in which various embodiments may be implemented. This lookup operation assumes a cache invariant is in effect whereby no regions are overlapping or continuous to each other. In a first step 600 the region cache manager receives a request for a cache lookup. This request may be received from a software application that is local or across a network. In this example, the regions in the cache are sorted by the starting index of each region, as shown in the examples of FIGS. 3A and 3B described above.

In step 605, the region cache manager then searches the region cache for the position of the region corresponding to the request using a binary search, as explained above. In step 610, the requested region is returned. Because the cache invariant is guaranteed, a single lookup using the binary search described above yields the region of interest. Also, because the regions are sorted by starting index, the search returns the position of the region with a starting index that is closest to the starting index of the request, but still smaller than the starting index of the request.

The region cache manager then determines if the returned region can contain the requested region in step 615. If the result of this determination is positive, then in step 620 the region cache manager determines that a cache hit occurred. Subsequently, in step 625, the region cache manager returns the requested region to the requesting application. If the result of the determination in step 615 is negative, then the region cache manager determines that a cache miss has occurred in step 630. The region cache manager then notifies the requesting application of the cache miss in step 635. Next, the region cache manager will receive an allocation request from the requesting application in step 640. The region cache manager then stores this resource into the region cache as a region using the insertion operation described above with reference to FIG. 4.

Figure 7:
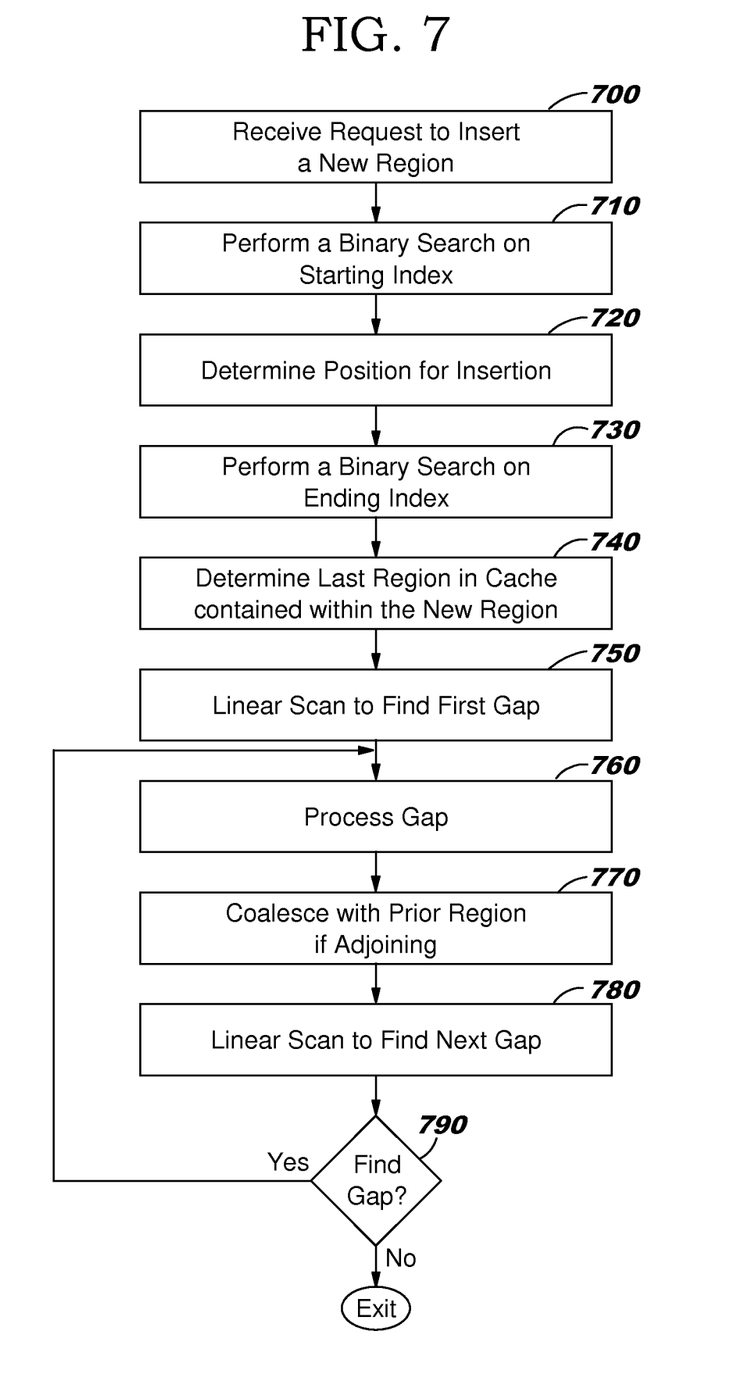
FIG. 7 is a flowchart of inserting a new region into a region cache in accordance with a second embodiment.

FIG. 7 is a flowchart of inserting a new region into a region cache in accordance with a second embodiment. In a first step 700 the region cache manager receives a request to insert a new region into the region cache. This request may be received from a software application that is local or across a network. The request should include a starting index and an ending index of the requested region to be inserted. In step 710, the region cache manager performs a binary search on the current region cache to find the position of insertion. In this embodiment, the current regions are sorted by starting index, so the binary search is performed using that starting index. Alternative embodiments may use alternative types of searches or the regions may be sorted by ending index. If sorted by ending index, then steps 710 and 730 may be reversed so that the ending index of the current region cache is searched first.

The binary search does not search for an exact match, but returns results based on criteria and assumptions that are guaranteed by the cache invariant. The binary search takes the starting index of the region to be inserted as input, and returns a position. More specifically, in this one dimensional case, the regions are sorted by the starting index in increasing order in the cache, and the binary search returns the position of the region whose starting index is greatest but smaller than the starting index of the region to be inserted. In an embodiment where the binary search is on the ending index of the region to be inserted, the binary search returns the region whose index is smallest but greater than the ending index of the region to be inserted. Because the region cache manager ensures that the cache invariant holds true, the cache is guaranteed to be free of regions that are entirely contained within another region. Therefore, the simple binary search criteria always return positive results, even though an exact match is not always returned.

Based on the binary search results, the position of insertion is determined in step 720. However, if the starting index of the region being inserted is less than the starting index of the identified current region (i.e. there is no current region with a lower starting index), then the starting index of the region being inserted is used as the starting insertion index. This starting position for insertion is referred to herein as the first marked position. In the above described examples, the result of this initial search would be A1 of region R1 in the example of FIG. 3A and A13 of region R12 in the example of FIG. 3B.

The region cache manager then performs a second binary search on the ending index of the new region in step 730. In step 740, the region cache manager determines the last region in the cache that is at least partially contained within the region to be inserted. In this example, the search returns the ending index of a current region in the cache with the greatest starting index that is smaller than the ending index of the new region requested to be inserted. However, if the ending index of the region being inserted is greater than the ending index of the identified current region, then the ending index of the region being inserted is used as the ending insertion index. This ending index for insertion is referred to herein as the second marked position. In the above described examples, the result of this second search would be A10 of region R4 in the example of FIG. 3A and A17 of region R12 in the example of FIG. 3B.

In step 750, the area between the first marking position and the second marking position is scanned linearly to identify a first gap not currently occupied by existing regions. In the above described examples, the result of this identification would be C2 in the example of FIG. 3A and C11 in the example of FIG. 3B. This gap is then processed in step 760 to register that gap. The type of processing or registration would depend on the use of the region cache. For example, if the region cache is used for RDMA data transfers, the registration would be for pinning memory to prevent the physical memory from being swapped out. Areas already occupied by existing regions do not need to be processed because those areas are already registered. This processing of gaps results in the new region being inserted into the region cache, albeit piecemeal. In step 770, a coalescing operation is performed as shown in either FIG. 5A or 5B to coalesce the processed gap region with the prior current region(s) if they are adjoining. This can be up to two prior regions to be coalesced with the processed gap if this is the second or third gap to be processed for the region being inserted. This removes the gap as a separate region and reduces the number of regions to be searched in additional region insertion operations or future cache lookup operations.

In step 780, the area between the first marking position and the second marking position is continued to be scanned linearly to identify another gap not currently occupied by existing regions. If no further gap is found them processing can cease for this region insertion. If a gap is found, then processing can continue to step 760 described above.

Although the above embodiments illustrate managing a one dimensional region caching model, region caches with two or more dimensions may be similarly managed with the same cache invariant.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as a region cache manager. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing a cache region comprising:
   receiving a new region to be stored within the cache, the cache including multiple regions defined by one or more ranges having a starting index and an ending index; and
   storing the new region in the cache in accordance with a cache invariant, the cache invariant ensuring that regions in the cache are not overlapping and that the regions are stored in a specified order.

2. The method of claim 1 further comprising coalescing contiguous regions into a single region.

3. The method of claim 2 wherein the cache invariant ensures that regions in the cache are not contiguous to each other.

4. The method of claim 1 wherein only portions of the new region that are not overlapping the multiple regions are processed.

5. The method of claim 1 wherein the multiple regions are stored according to starting index.

6. The method of claim 5 wherein the cache invariant ensures that regions are stored in by starting index.

7. The method of claim 1 wherein the multiple regions are stored according to ending index.

8. The method of claim 7 wherein the cache invariant ensures that regions are stored by ending index.

9. The method of claim 3 wherein storing the region in the cache in accordance with a cache invariant includes:
   identifying a region starting index and a first region corresponding to the region being stored;
   identifying a region ending index and a last region corresponding to the region being stored;
   linearly identifying a set of gaps between each of the first region, the last region and each region between the first and last regions; and
   coalescing the first region, the last region, each region between the first and last regions, and the set of gaps from between the region starting index and the region ending index.

* * * * *